Nov. 4, 1969     L. V. WESTBROOK     3,477,004
CONTROL APPARATUS
Filed Jan. 11, 1968
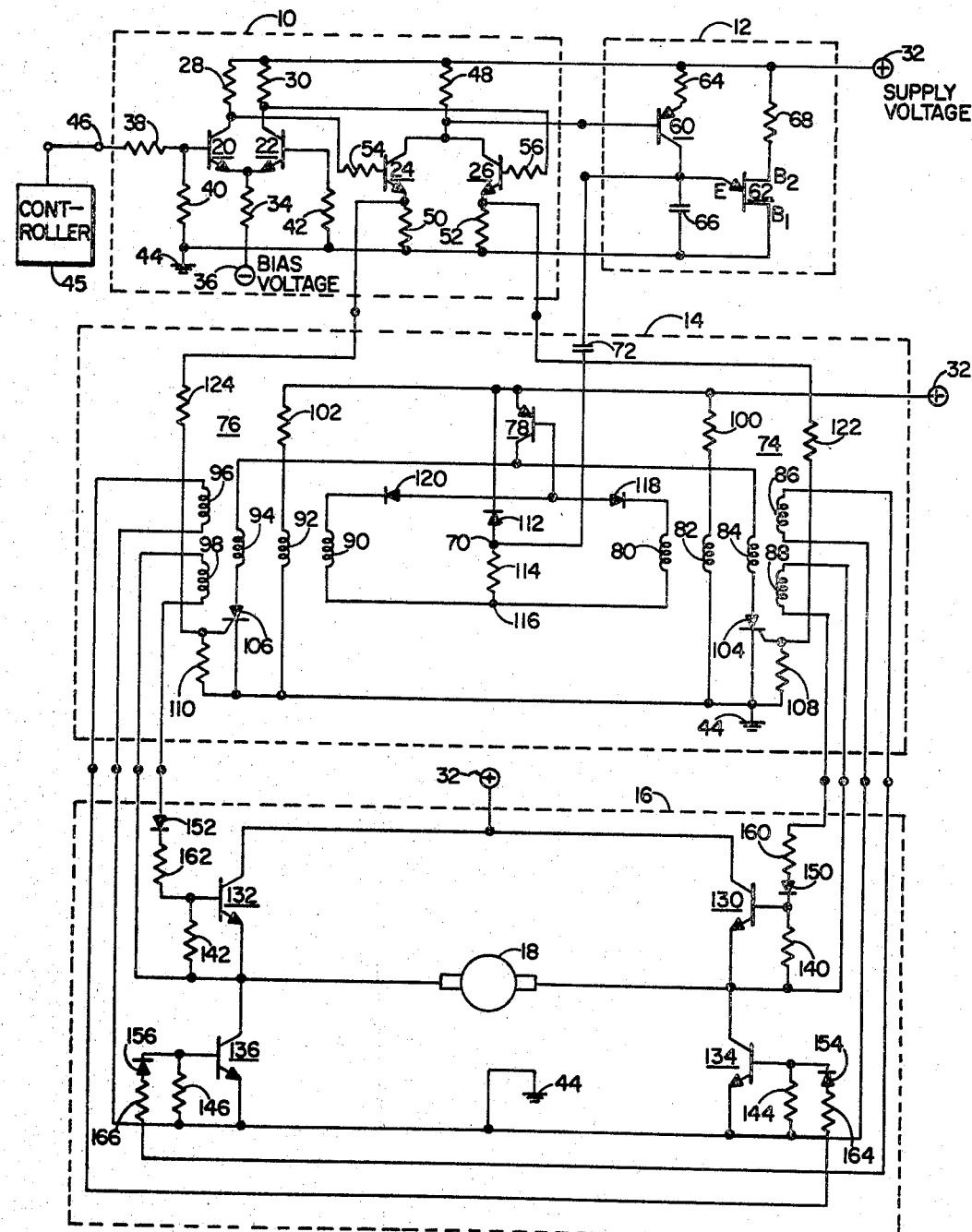
INVENTOR.
LOWELL V. WESTBROOK
BY Charles J. Ungemach
ATTORNEY 3,477,004
Patented Nov. 4, 1969

3,477,004
CONTROL APPARATUS
Lowell V. Westbrook, Excelsior, Minn., assignor to Honeywell Inc., Minneapolis, Minn., a corporation of Delaware
Filed Jan. 11, 1968, Ser. No. 697,225
Int. Cl. H02p 1/22, 1/40, 3/20
U.S. Cl. 318—257
4 Claims

ABSTRACT OF THE DISCLOSURE

A solid-state electronic circuit for controlling the direction and speed of rotation of a motor in accordance with an input voltage. The circuit provides pulses of fixed width on either one of two output lines, depending on the polarity of the input voltage, which control a bridge circuit supplying power to the motor. The circuit also controls the speed of motor rotation by varying the frequency of the pulses in accordance with the amplitude of the input voltage.

BACKGROUND

The invention is in the field of motor control. More particularly, the invention is a circuit for controlling the speed and direction of rotation of a D-C motor in response to a D-C control voltage.

SUMMARY

The invention provides a circuit for controlling the direction of rotation and the speed of a motor. The circuit provides an output signal on either one of two output lines depending on the polarity of an input signal. The output signal is in the form of a train of periodic pulses provided, for example, by a blocking oscillator. The blocking oscillator includes a transistor and two transformers. Each transformer is associated with one of the output lines and only one transformer is in circuit at any given time.

A logic circuit provides a signal which switches one or the other of the transformers into the blocking oscillator circuit as a function of the polarity of the input signal. The logic circuit also provides a signal to a free-running oscillator, for example, a unijunction oscillator, which oscillates at a frequency which is a function of the amplitude of the input signal.

The free-running oscillator provides a signal which is used to drive or trigger the blocking oscillator. In this way a motor control signal having a variable frequency is provided on either one of two control lines. The motor control signal is applied, for example, to a bridge circuit which supplies power to the motor in accordance with the control signal.

In other motor control circuits it is customary to provide two blocking oscillators and two free-running oscillators to accomplish the same result that is accomplished by the present invention.

BRIEF DESCRIPTION OF THE DRAWING

The drawing is a schematic diagram of a circuit for controlling the output direction of rotation and the speed of an electric motor.

DESCRIPTION OF THE PREFERRED EMBODIMENT

The drawing shows a schematic diagram of one application of a motor control apparatus. The motor control apparatus comprises a logic circuit 10, a free-running oscillator 12, a blocking oscillator 14, and a bridge circuit 16, including a motor 18.

Logic circuit 10 comprises NPN junction transistors 20, 22, 24 and 26, each having base, collector and emitter electrodes. Reesistors 28 and 30 are connected from the collectors of transistors 20 and 22, respectively, to a positive D-C supply voltage 32. Transistors 20 and 22 are balanced and resistors 28 and 30 are of equal resistance. The emitters of transistors 20 and 22 are tied together at a common junction point and a resistor 34 is connected from the junction point to a negative D-C bias voltage 36. Resistors 40 and 42 are connected from the bases of transistors 20 and 22, respectively, to a ground reference potential 44. Also connected to the base of transistor 20 is one end of a resistor 38, the other end of which is connected to an input terminal 46. Motor 18 is controlled as a function of a D-C control voltage which is applied to input terminal 46. The direction of rotation of motor 18 depends upon the polarity of the control voltage at terminal 46 whereas the speed of rotation depends upon the amplitude. The negative bias voltage 36 is chosen such that the collectors of transistors 20 and 22 are at ground potential when the input signal at terminal 46 is zero volt.

The collectors of transistors 24 and 26 are tied together at a common junction point and a resistor 48 is connected from the junction point to the supply voltage 32. Resistors 50 and 52 are connected between the emitters of transistors 24 and 26, respectively, and ground reference potential 44. A resistor 54 is connected between the collector of transistor 20 and the base of transistor 24 and a resistor 56 is connected between the collector of transistor 22 and the base of transistor 26.

Assume that the D-C potential at input terminal 46 is zero volts and that transistors 20 and 22 are balanced and biased such that the collector of each is at ground potential. If a positive voltage is applied to input terminal 46, transistor 20 turns on to a greater extent and transistor 22 turns off. The potential at the collector of transistor 20 goes positive causing a positive signal to be applied to the base of transistor 24 turning it on. The potential at the collector of transistor 24 becomes less positive when transistor 24 is turned on.

Oscillator circuit 12 comprises transistors 60 and 62. Transistor 62 is a unijunction transistor and oscillator 12 may be classified as a unijunction oscillator. Transistor 60 has emitter, base and collector electrodes and is of the PNP type. Unijunction transistor 62 has an emitter electrode and first and second base electrodes. A resistor 64 is connected from the emitter electrode of transistor 60 to the positive supply voltage 32. The base of transistor 60 is connected to a junction point which is common to the collector electrodes of transistors 24 and 26. A capacitor 66 is connected between the collector electrode of transistor 60 and ground reference potential 44. The first base electrode of unijunction transistor 62 is connected to ground reference potential 44 and a resistor 68 is connected from the second base electrode of unijunction transistor 62 to the positive D-C supply voltage 32. The emitter electrode of unijunction transistor 62 is connected to the collector electrode of junction transistor 60. The output of unijunction oscillator 12 is developed across capacitor 66 and is coupled to a junction point 70, located in blocking oscillator 14, by a coupling capacitor 72. The output signal of oscillator 12 consists of a series of negative trigger pulses. Capacitor 66 charges to the positive D-C supply voltage 32 at a rate depending upon the resistance of resistor 64 and the emitter to collector resistance associated with transistor 60. The resistance associated with the emitter-collector junction in transistor 60 depends, of course, on the base to emitter bias of that transistor. Capacitor 66 which is connected across the emitter and first base electrodes of unijunction transistor 62 charges toward the D-C potential associated with D-C source 32 until the potential at the emitter electrode of transistor 62 reaches a value which is equal to $V_p$, the unijunction transistor peak point emitter voltage, transistor 62 breaks down and capacitor 66 is rapidly discharged through transistor 62. The voltage at which the emitter of a unijunction breaks down is called the "peak point emitter voltage" ($V_p$). The value of this voltage is defined by the equation $V_p = hV_{BB} + V_D$ where $V_D$ = emitter diode voltage (approximately 0.67 volt at 25° C.); $V_{BB}$ = interbase voltage; $h$ = intrinsic standoff ratio = .47 to .8 (depends on type of unijunction and will be different for individual unijunctions of the same type). The rapid discharge of capacitor 66 develops negative pulses at junction point 70 in blocking oscillator 14. The frequency of oscillator 12 depends upon the capacity of capacitor 66, the resistance of resistor 64, and the bias level associated with transistor 60. The maximum possible rate at which capacitor 66 can charge depends upon the RC time constant of resistor 64 and capacitor 66.

Blocking oscillator 14 includes a first transformer 74, a second transformer 76, and a PNP junction transistor 78. Transistor 78 has emitter, collector and base electrodes. Transformer 74 has five windings 80, 82, 84, 86 and 88. Winding 80 is a feedback winding, winding 82 is a reset winding, winding 84 is a load winding, and windings 86 and 88 are output windings. Transformer 76 is identical with transformer 74 and has windings 90, 92, 94, 96 and 98 which correspond with windings 80, 82, 84, 86 and 88, respectively. Resistors 100 and 102 are connected in series with reset windings 82 and 92 respectively and each series circuit thereby formed is connected between the positive D-C supply voltage 32 and ground reference potential 44. The emitter electrode of transistor 78 is connected to the D-C voltage supply 32. The collector electrode of transistor 78 is connected to one end of load winding 84 and one end of load winding 94. The other end of load winding 84 is connected to the anode electrode of a silicon control rectifier 104, the cathode of which is connected to ground reference potential 44. The other end of load winding 94 is connected to the anode electrode of a silicon controlled rectifier 106, the cathode of which is connected to ground reference potential 44. Resistors 108 and 110 are connected from the gate electrodes of SCR's 104 and 106, respectively, to ground reference potential 44.

A diode 112 is connected from junction point 70 to the positive D-C supply voltage 32. Diode 112 is connected such that it conducts only if the potential at junction point 70 is greater than +V. Also connected to junction point 70 is one end of a resistor 114, the other end of which is connected to a junction point 116. First and second series circuits are connected between the base electrode of transistor 78 and junction point 116. The first circuit comprises a diode 118 and winding 80, the second circuit comprises a diode 120 and winding 90. Diodes 118 and 120 are connected such that current flows in each circuit only when junction point 116 is negative with respect to the base electrode of transistor 78. A resistor 122 connects the emitter electrode of transistor 26 to the gate electrode of SCR 104 and a resistor 124 connects the emitter electrode of transistor 24 to the gate electrode of SCR 106. Transistors 26 and 24 provide gating signals which switch SCR's 104 and 106. Therefore when transistor 26 conducts and its emitter electrode goes positive, a gating signal is supplied to the gate electrode of SCR 104 switching it on and allowing load winding 84 to be energized. If tranistor 24 is conducting rather than transistor 26, a gating signal is applied to SCR 106 and it switches on allowing load winding 94 to be energized. In this way either transformer 74 or transformer 76 is selected to operate as a part of blocking oscillator 14.

Bridge circuit 16 comprises NPN transistors 130, 132, 134, and 136, each having collector, base and emitter electrodes. The collector electrodes of transistors 130 and 132 are connected to the positive D-C supply voltage 32. The emitter electrodes of transistors 134 and 136 are tied together and connected to the reference ground potential 44. The emitter electrode of transistor 130 is connected to the collector electrode of transistor 134 and the emitter electrode of transistor 134 is connected to the collector electrode of transistor 136. A D-C motor 18 is connected between the emitter electrodes of transistors 130 and 132. Resistors 140, 142, 144 and 146 are connected across the base-emitter junctions of transistors 130, 132, 134, and 136, respectively. Output winding 88 of transformer 74 is connected in series with a resistor 160 and a diode 150 and this series circuit is connected across resistor 140. Winding 86 of transformer 74 together with a resistor 166 and a diode 156 forms a series circuit which is connected across resistor 146. Output winding 98 of transformer 76 together with a diode 152 and a resistor 162 form a series circuit which is connected across resistor 142. Output winding 96 of transformer 76 together with a resistor 164 and a diode 154 form a series circuit which is connected across resistor 144. Transistors 130, 132, 134 and 136 form the legs of bridge circuit 16. Transistors 130, 132, 134 and 136 in bridge 16 operate as pairs when bridge 16 is energized. Transistors 130 and 136 form one pair and transistors 132 and 134 form other pair. When transistors 130 and 136 are energized, current flows from the positive D-C supply 32 through tranistor 136. Note that the current flows from right to left in motor 18. When transistors 132 and 134 are energized, rather than transistors 130 and 136, current flows from the positive D-C supply 32 through transistor 132, motor 18 and transistor 134. Current flow in motor 18 is then from left to right. The direction of current flow in motor 18, of course, determines the direction of rotation of motor 18.

OPERATION

The motor control apparatus detects a D.C. voltage, developed by a controller 45, at input terminal 46 and delivers a current to motor 18 which will drive it in either direction depending upon the polarity of the input signal at terminal 46. The speed of rotation of motor 18 depends upon the amplitude of the input signal at terminal 46. The signal which drives motor 18 consists of a series of pulses of fixed length occurring at a variable frequency. The length is fixed by the blocking oscillator 14 and the frequency varies in accordance with the frequency of oscillator 12. Assume that transistors 20 and 22 are balanced and biased so that the collector of each is at ground potential. If a positive D-C voltage is applied to input terminal 46, the base of transistor 20 goes positive, forward biasing transistor 20, causing it to conduct to a greater extent. Because transistor 20 begins conducting to a greater extent, its emitter electrode goes positive which causes the emitter-base junction of transistor 22 to be back biased. Back biasing transistors 22, of course, turns it off. Therefore, upon application of a positive voltage to input terminal 46, transistor 20 turns on and transistor 22 turns off. The collector electrode of transistor 22 which was at ground potential is now at some positive potential which provides a base drive signal for transistor 26. Transistor 26 turns on in response to the positive potential applied to its base electrode. When transistor 26 is turned on, the potential at its collecor electrode decreases and the potential at its emitter electrode increases. A negative going potential at the collector of transistor 26 causes transistor 60 to be turned on and unijunction oscillator 12 begins oscillating at a relatively low frequency. The positive going potential present at the emitter electrode of transistor 26 is applied to the gate electrode of SCR 104, enabling it. Thus blocking oscillator 14 comprises transformer 74, rather than transformer 76, and the load winding 84 of transformer 74 is connected in series with the collector of transistor 78. When unijunction transistor 62 breaks down and capacitor 66 discharges a negative pulse is applied to the base of transistor 78 causing the blocking oscillator circuit to be actuated. The blocking oscillator goes through one complete cycle and output pulses are generated on output windings 86 and 88. Blocking oscillator 14 is a one shot blocking oscillator and it forms a single pulse for each input trigger pulse delivered to it from unijunction oscillator 12. The fixed length pulses developed across windings 86 and 88 are applied to the base-emitter junctions of transistors 136 and 130, respectively, turning them both on. During the time that transistors 130 and 136 are turned on, current flows from source 32 through motor 18 from right to left. In this way a current pulse of fixed length is applied to motor 18 in a predetermined direction for each cycle of unijunction oscillator 12.

If the amplitude of the D-C voltage at input terminal 46 is increased, the base of transistor 60 becomes even less positive and transistor 60 turns on harder. This causes unijunction oscillator 12 to oscillate at a higher frequency and therefore pulses of current of a fixed length are delivered to motor 18 at a higher rate. This increases the average power delivered to motor 18 and its speed increases. The minimum time between pulses of oscillator 12 is limited. The time between pulses of oscillator 12 must be at least as great as the time of one pulse from blocking oscillator 14 plus the time it takes the blocking oscillator to be reset. This lower time limit is adjusted by the proper selection of resistor 64 and capacitor 66.

If a negative rather than a positive voltage is applied to input terminal 46, transformer 76 is placed in the blocking oscillator circuit, transistors 132 and 136 are turned on, and motor 18 runs in the opposite direction.

This circuit is novel to the extent that it uses a single free-running oscillator and a single blocking oscillator rather than two separate free-running oscillators and two separate blocking oscillators which would normally be used in a motor controller of this type.

Blocking oscillator 14 is a one shot blocking oscillator and its operation is well known to those skilled in the art. The blocking oscillator is triggered by applying negative pulses to junction point 70. The negative pulse forward biases transistor 78 and current flows from the emitter to the base of transistor 78. Base current flows in the circuit comprising diode 118, winding 80 of transformer 74, and resistor 114 or the circuit comprising diode 120, winding 90 of transformer 76, and resistor 114. The blocking oscillator goes through one operating cycle and a pulse is produced at the appropriate output windings. If SCR 104 is gated, output pulses are produced at windings 86 and 88 of transformer 74. If SCR 106 is gated, output pulses are developed across output windings 96 and 98 of transformer 76.

The invention is not to be limited to the single embodiment shown and disclosed herein. Probably there are other embodiments which come within the spirit and scope of the invention. The invention is to be limited only by the following claims.

I claim:
1. Apparatus for controlling the direction and the speed of rotation of a motor comprising:
a D-C voltage controller having an output means, the polarity of the voltage of the controller determining the direction of rotation of the motor and the magnitude determining the speed of rotation;
logic means having an input means and first, second and third output means, the input means connected to the output means of the voltage controller, the logic means developing a signal at its first output means when the polarity of the source voltage is positive and at its second output means when the polarity is negative, and developing a signal at its third output means of fixed polarity and of an amplitude proportional to the absolute magnitude of the controller voltage;
oscillator means having input and output means, the input means connected to the third output means of the logic means, the oscillator developing an A-C signal at its output means having a frequency porportional to the amplitude of the signal at its input means;
pulse generator means having first, second and third input means and first and second output means, the first and second input means connected to the first and second output means respectively of the logic means, the third input means connected to the output means of the oscillator, the pulse generating means developing pulses of a fixed duration at its first output means at the frequency of the oscillator when a signal is present at the first input means and at its second output means when a signal is present at its second input means; and,
a bridge circuit, including a power source, the motor connected in the bridge circuit, the bridge circuit connecting the motor in circuit with the power source and responsive to the pulses at the first output means of the pulse generator to rotate the motor in one direction and responsive to pulses at the second output means of the pulse generator to rotate the motor in the other direction, the rate of rotation depending upon the frequency of the pulses.

2. The apparatus of claim 1 wherein the logic means comprises:
a D-C supply voltage source;
a D-C bias voltage source;
first and second balanced transistors, the collector of each connected to the D-C supply source by a resistor, the base of each connected to a reference potential by a resistor, the emitters connected together and connected to the D-C bias voltage blocking resistor, the base of the first transistor connected to the voltage controller so that the potential of the base follows the potential of the controller;
third and fourth transistors, their collectors connected together and connected to the D-C supply source by a resistor, the base of the third transistor connected to the collector of the first transistor by a resistor, the base of the fourth transistor connected to the collector of the second transistor by a resistor, the emitter of each connected to the reference potential by a resistor, the first and second output means of the logic means including the emitters of the third and fourth transistors, respectively, the third output means of the logic means including the collectors of the third and fourth transistors.

3. The apparatus of claim 1 wherein the oscillator means comprises a junction transistor having base, emitter and collector electrodes, a capacitor, first and second resistors, and a unijunction transistor having first and second base electrodes and an emitter electrode, the base electrode of the junction transistor connected to the input means of the oscillator means, the emitter electrode connected to a D-C supply voltage source by the first resistor, the collector connected to a reference potential by the capacitor, to the output means of the oscillator means, and the emitter electrode of unijunction transistor, the second base electrode of the unijunction oscillator connected to the supply voltage source by a second resistor and the first base electrode connected to the reference potential.

4. The apparatus of claim 1 wherein the pulse generator means is a blocking oscillator comprising a transistor and a first or second transformer switched into circuit with the transistor depending on the signals developed at the first and second output means of the logic means.

References Cited

UNITED STATES PATENTS

| 3,260,912 | 7/1966 | Gregory | 318—341 |
| 3,293,522 | 12/1966 | Lewis | 318—257 |
| 3,233,161 | 2/1966 | Sikorra | 318—257 |
| 3,428,881 | 2/1969 | Cote | 318—341 |

ORIS L. RADER, Primary Examiner

K. L. CROSSON, Assistant Examiner

U.S. Cl. X.R.

318—294, 341